J. K. KEPNER.
DOUBLE TONGUE FOR HARVESTERS.
No. 10,238. Reissued Nov. 14, 1882.
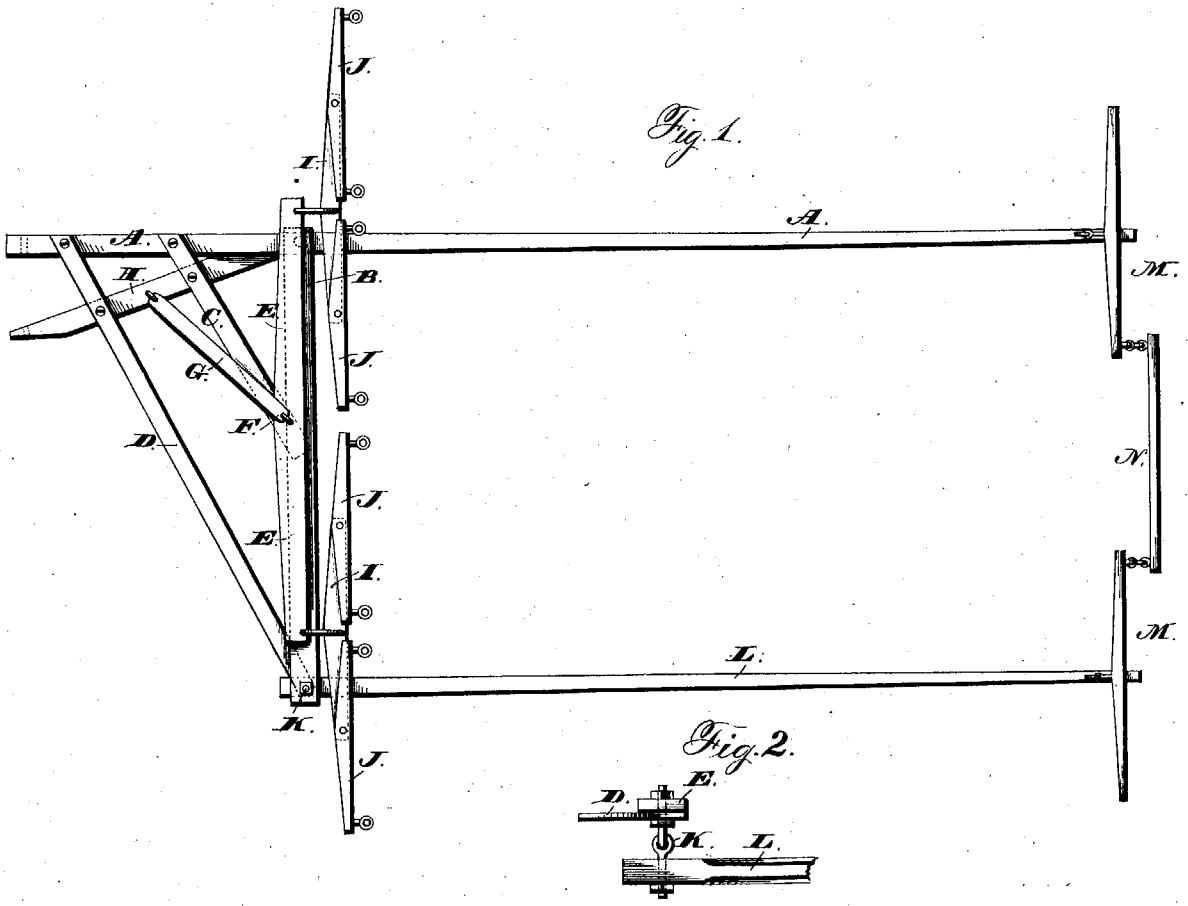
WITNESSES
Jas. E. Hutchinson.
Geo. D. Seymour.
INVENTOR
J K. Kepner.
By H A Seymour.
Attorney
N. PETERS, Photo-Lithographer, Washington, D. C.

UNITED STATES PATENT OFFICE.

JOHN K. KEPNER, OF LITTLE VALLEY, MINNESOTA.

DOUBLE TONGUE FOR HARVESTERS.

SPECIFICATION forming part of Reissued Letters Patent No. 10,238, dated November 14, 1882.

Original No. 241,996, dated May 24, 1881. Application for reissue filed April 26, 1882.

*To all whom it may concern:*

Be it known that I, JOHN KLINE KEPNER, of Little Valley, in the county of Olmsted and State of Minnesota, have invented a new Improvement in Double Tongues for Harvesters, of which the following is a full, clear, and exact description.

Figure 1 is a plan view of my improvement. Fig. 2 is a side elevation of a part of the same, showing the connection between the second tongue and cross-bar.

The object of this invention is to facilitate the use of four or more horses abreast in operating harvesters.

With this end in view the invention consists in a double tongue for harvesters, consisting of the ordinary tongue, having a secondary tongue connected with it by a cross-bar.

My invention further consists in a double tongue for harvesters, consisting of the ordinary tongue, having a secondary tongue connected with it by a cross-bar, and a four-horse evener pivoted to the said cross-bar and provided with two two-horse eveners having single-trees attached to them.

My invention further consists in a double tongue for harvesters, consisting of the ordidary tongue, having a secondary tongue connected with it, and a jockey uniting the outer ends of the tongues.

My invention further consists in certain details of construction and combinations of parts, as will be hereinafter described, and pointed out in the claims.

A represents the ordinary tongue, which is connected with the harvester in the usual manner.

To the tongue A, at a little distance from its rear end, is attached the end of the cross-bar B. The connection between the tongue A and the cross-bar B is strengthened by the inclined braces C D. The end of the rear or long brace, D, is attached to the tongue A near its rear end. The other end of the brace D is attached to the outer end of the cross-bar B. The end of the forward or short brace, C, is attached to the tongue A about midway between the ends of the cross-bar B and the brace D. The brace C is parallel with the brace D, and its other end is attached to the middle part of the cross-bar B.

To the cross-bar B, eighteen inches (more or less) from the tongue A, as the draft of the harvester may require, is pivoted the four-horse evener E by a bolt, F, which bolt F is strengthened by a hammer-strap, G. The rear end of the hammer-strap G is hinged to the hound H of the tongue A. The four-horse evener E is provided at each end with a two-horse evener, I, which is provided with single-trees J in the ordinary manner.

With the outer end of the cross-bar B is connected, by interlocked eyebolts K or other suitable means, the rear end of the second tongue, L, the upper eyebolts K serving also to secure the end of the brace D to the end of the cross-bar B. The eyebolts K are secured to the cross-bar B and tongue L by nuts, so that the second tongue, L, can be detached when only two or three horses are to be used. With this construction it is necessary that the forward ends of the tongues A L should be so connected that they cannot be forced apart by the side pressure of the horses in guiding and turning the machine. To accomplish this the inner ends of the neck-yokes M, which are attached to the forward ends of the tongues A L in the ordinary manner, are connected by a jockey-stick, N. The ends of the jockey-stick N are connected with the ends of the neck-yokes M by strong harness-snaps or other suitable means, so that the said jockey-stick N can be readily detached when required.

This invention was rendered necessary from the fact that only one horse can travel between the tongue A and the standing grain, and from the further fact that it is very difficult and dangerous for the driver upon a harvester to drive four horses when one span is placed in front of the other; but when the four horses are placed abreast the driver can guide and control them with ease; and also from the fact that on hilly land two or three ordinary horses are not strong enough to do satisfactory work.

Having fully described my invention, what I claim as new, and desire to secure by Letters Patent, is—

1. The combination, with an ordinary tongue constructed to be connected with the machine or vehicle, of a cross-bar secured at one end to said tongue, and a secondary tongue secured at its rear end to the outer end of said cross-bar, the two tongues being equal, or practically equal, in length, substantially as set forth.

2. The combination, with an ordinary tongue constructed to be connected with a machine or vehicle, of a cross-bar secured at one end to said tongue, a secondary tongue secured at its rear end to the outer end of the cross-bar, the two tongues being equal, or practically equal, in length, a four-horse evener pivoted to said cross-bar, two-horse eveners connected with the opposite ends of said four-horse eveners, and single-trees pivoted to the opposite ends of the two-horse eveners, substantially as set forth.

3. The combination, with an ordinary tongue constructed to be connected with the machine or vehicle, of a cross-bar secured at one end to said tongue, a secondary tongue secured at its rear end to the outer end of said cross-bar, the two tongues being equal, or practically equal, in length, and a diagonal brace extending from the rear portion of the ordinary tongue to the cross-bar, substantially as set forth.

4. The combination, with an ordinary tongue constructed to be connected with the machine or vehicle, of a cross-bar secured at one end to said tongue, a secondary tongue secured at its rear end to the outer end of said cross-bar, yokes attached to the outer ends of the tongues, and a jockey-stick for uniting the yokes, substantially as set forth.

In testimony whereof I have signed this specification in the presence of two subscribing witnesses.

JOHN KLINE KEPNER.

Witnesses:

NELLIE L. KEPNER,

M. L. KEPNER.